L. DINESEN.
MILKING APPARATUS.
APPLICATION FILED DEC. 22, 1919.
1,408,695.
Patented Mar. 7, 1922.
2 SHEETS—SHEET 2.
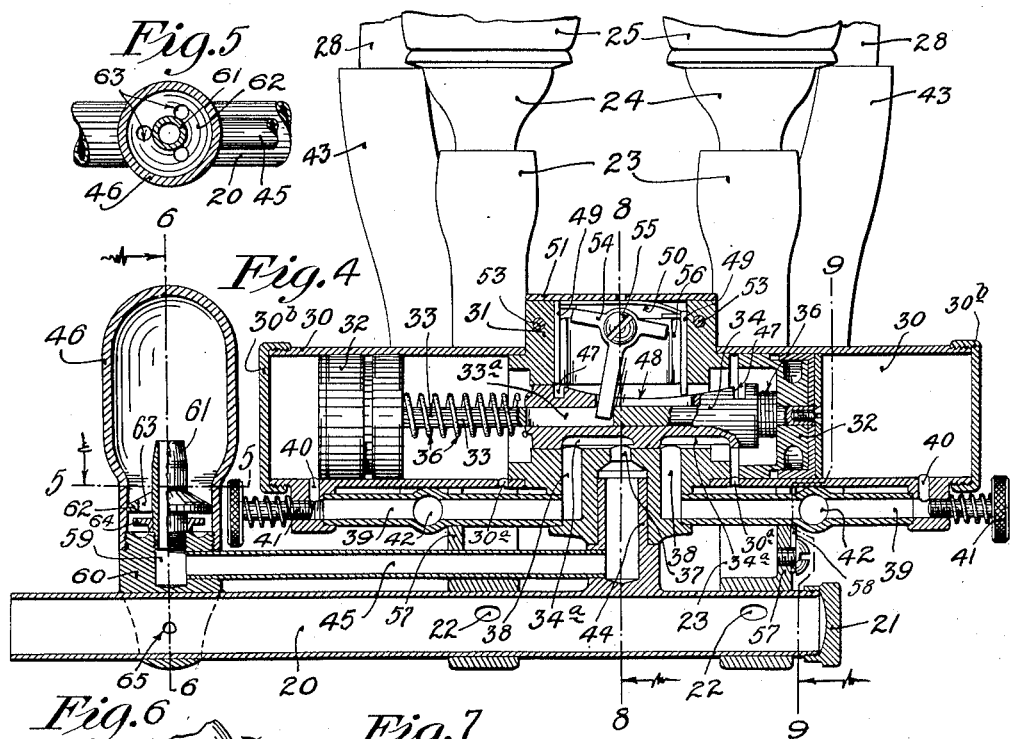
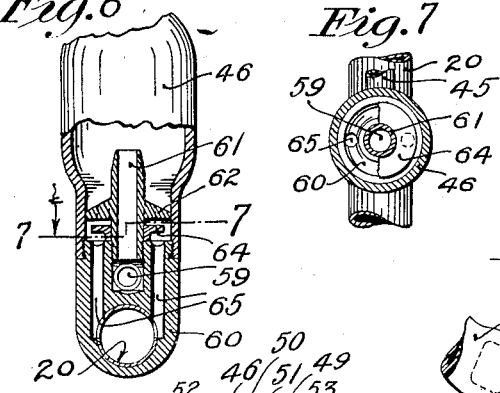
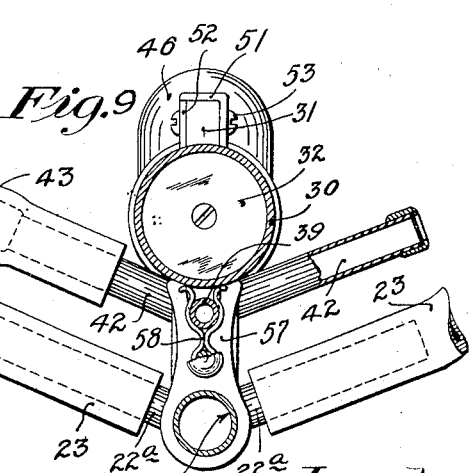
Inventor
Laurits Dinesen
By his Attorneys

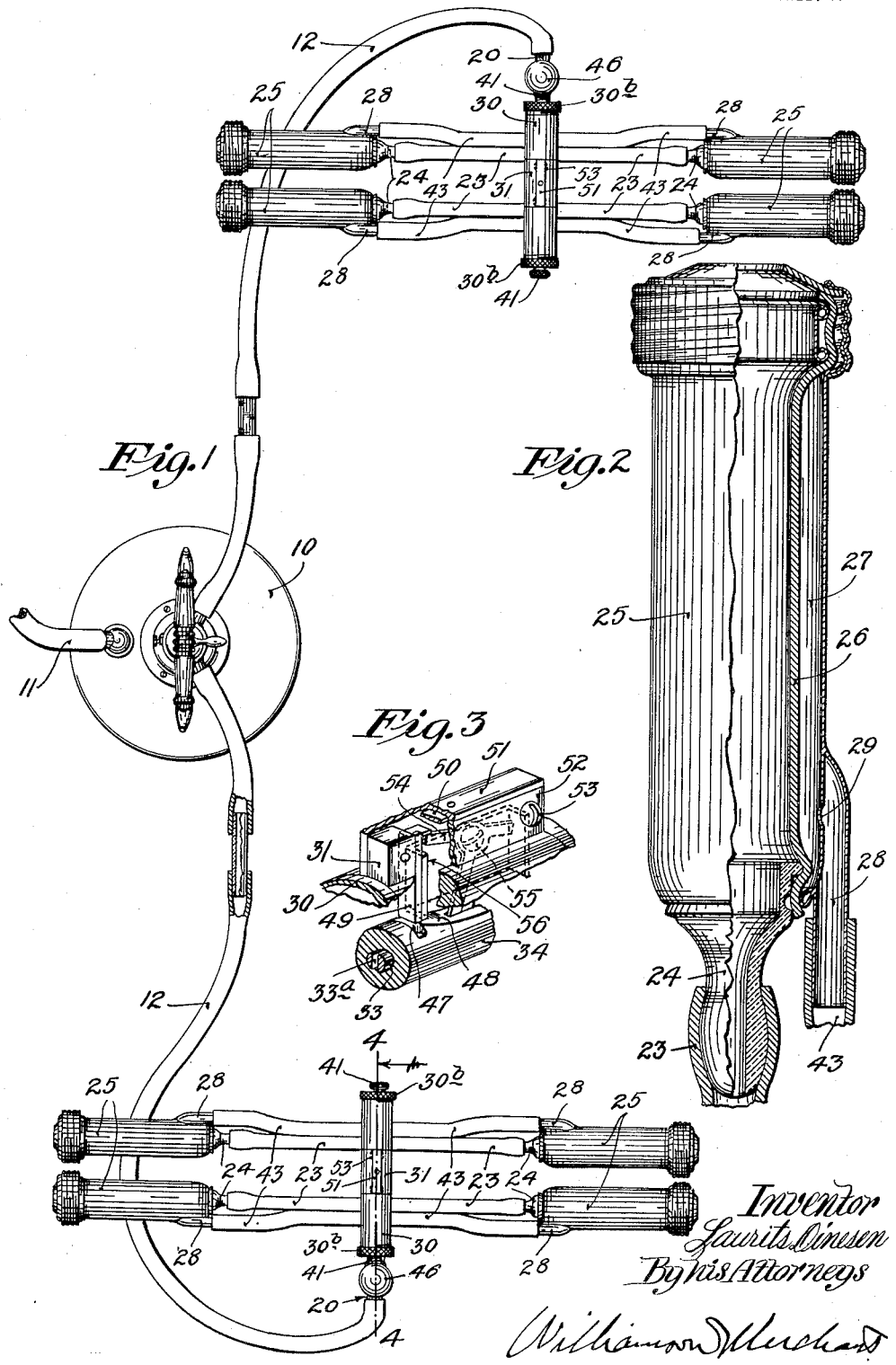

UNITED STATES PATENT OFFICE.

LAURITS DINESEN, OF MINNEAPOLIS, MINNESOTA, ASSIGNOR, BY MESNE ASSIGNMENTS, TO PERFECTION MANUFACTURING COMPANY, OF MINNEAPOLIS, MINNESOTA, A CORPORATION OF MINNESOTA.

MILKING APPARATUS.

1,408,695.  Specification of Letters Patent.  Patented Mar. 7, 1922.

Application filed December 22, 1919. Serial No. 346,572.

*To all whom it may concern:*

Be it known that I, LAURITS DINESEN, a citizen of the United States, residing at Minneapolis, in the county of Hennepin and State of Minnesota, have invented certain new and useful Improvements in Milking Apparatus; and I do hereby declare the following to be a full, clear, and exact description of the invention, such as will enable others skilled in the art to which it appertains to make and use the same.

My present invention relates to milking apparatus and is in the nature of an improvement on or refinement of the milking apparatus disclosed and broadly claimed in my prior application S. N. 287,256, filed of date, April 3rd, 1919, and entitled "Milking apparatus." Generally stated, the invention consists of the novel devices and combinations of devices hereinafter described and defined in the claims.

The drawings of this application illustrate a commercial device, many of the features of which are common with those disclosed in my said earlier application. For instance, in both applications I employ double chamber teat cups, that is teat cups having inner and outer chambers; I provide for each group of teat cups, a pulsator mechanism including a vacuum motor, which vacuum motor is located on the coupling head or claw in the group of teat cups, and hence, is at the receiving end of a milk tube; and the partial vacuum or suction for actuating the vacuum motor and, through the pulsator mechanism, for producing the pulsations in the teat cups, is delivered through a single main tube that serves both as the milk tube and the tube for rendering partial vacuum suction effective on the vacuum motor.

The chief feature of the present invention is in the provision and novel arrangement of a so-called equalizing vacuum chamber through which the suction or partial vacuum in the milk tube is rendered effective in its operation on the vacuum motor and on the teat cups, and through which air intermittently admitted to the teat cups is delivered to the milk tube. This equalizing vacuum chamber performs several highly important functions, all as will be hereinafter more fully explained, after first describing the preferred form of the milking apparatus illustrated in the accompanying drawings. In the said drawings, like characters indicate like parts throughout the several views.

Referring to the drawings:

Fig. 1 is a plan view illustrating the milking apparatus and showing what may be treated as a double unit apparatus comprising one milk pail and receptacle and two groups of teat cups, and which apparatus is adapted to simultaneously milk two cows;

Fig. 2 is an enlarged view showing one of the teat cups partly in plan and partly in axial section;

Fig. 3 is a fragmentary perspective showing one of the lock dogs and associated parts of the pulsator mechanism;

Fig. 4 is an enlarged vertical section taken on the line 4—4 of Fig. 1;

Fig. 5 is a horizontal section taken on the line 5—5 of Fig. 4;

Fig. 6 is a vertical section taken on the line 6—6 of Fig. 4;

Fig. 7 is a section on the line 7—7 of Fig. 6;

Fig. 8 is a section taken approximately on the line 8—8 of Fig. 4; and

Fig. 9 is a section taken approximately on the line 9—9 of Fig. 4.

In this apparatus, I preferably employ a milk pail or receptacle 10 in which a partial vacuum is maintained by suitable means, such as an air tube 11 extended from a nipple on the pail cover and connected to a vacuum pump or vacuum tank not shown.

For each group of teat cups there is a single tube that serves as a combined milk tube and air tube 12. In the two-group arrangement shown in Fig. 1 there are, of course, two of the said tubes 12, and each is connected to the interior of the pail or receptacle 10 so that, during the operation of the apparatus, there will be partial vacuum or suction constantly maintained in the said milk tubes.

Each flexible milk tube 12, at its extended or receiving end is connected to the tubular body 20 of a teat cup coupler head or claw. The extended end of the coupling tube 20 is closed by a cap 21 and said tube has four ports 22 that lead to corresponding nipples 22ª. These nipples 22ª are connected by short flexible branch milk tubes 23 and nipples 24 on the ends of the respective teat cups 25. These teat cups are preferably of the character disclosed and claimed in my prior Patent No. 1,201,808, of date, October 17, 1916, and the said cups are provided with tubular rubber inner walls or shells 26 that are collapsible and expansible and are spaced from the outer shells of the teat cups and afford annular air chambers 27. The air chambers 27 are connected to nipples 28 on the outer shells of the teat cups, through ports 29. The nipples 24 commingle with the chamber formed within the collapsible walls 26.

The common pulsator which controls the group of teat cups comprises axially aligned cylinders 30, rigidly secured to a centrally located metallic block 31, which, in turn, is connected, preferably detachably, to the coupling tube 20 in a manner which will be presently noted.

Working in the cylinders 30, are pistons 32 that are connected by an axial stem 33 passed through block 31. Mounted to slide on the intermediate portion of the piston rod 33, but held against rotation thereon, is a sleeve-like controller or valve 34, which valve works through and is seated against the lower walls of a passage formed in the block 31 concentric to the axis of piston rod 33. For an important purpose, coiled springs 36 placed around the end of the piston rod 33, are compressed between the respective pistons and the adjacent ends of the valve 34. Block 31 is provided with three ports 37 and 38—38, the two latter being connected by tubes 39 to ports 40, which latter open into the outer end portions of the cylinders 30. Choke valves 41 are applied to the cylinder castings adjacent to ports 40, to vary the cross section of the passage at those points and thus regulate the speed of movement of the piston, as will presently more clearly appear.

The air tubes 39 are provided with laterally projecting nipples 42, which by means of branch air tubes 43, are connected to the air nipples 28 of the respective teat cups.

The intermediate port 37 of block 31 has an enlarged extension that telescopes with very close engagement onto the coupling sleeve 44 that is projected upward from the coupling tube 20. In the specific arrangement illustrated in the drawings of my prior application above identified, the port 37, through a part corresponding to sleeve 44, was connected directly into the coupling tube 8, but in accordance with my present invention a very different arrangement is provided, and which is preferably as follows:

The interior of sleeve 44 does not open directly into tube 20 but is connected by the tube 45 that is indirectly connected to the tube 20 through the equalizing vacuum chamber 46 in a manner which will presently be described.

The controller valve 34, near its ends and on its upper portion, is provided with lock notches 47, and between these notches, is formed with a depressed cam surface 48. Mounted to slide vertically in the recessed upper portion of the block 31, is a pair of longitudinally spaced lock dogs 49, the lower ends of which, in a manner hereinafter described, co-operate with the respective lock notches 47 of the valve 34. At their upper ends, these dogs 49 are yieldingly pressed downward, as shown, by a leaf spring 50, seated against the top flange of an L-shaped plate 51. This plate 51 and a flat side plate 52, are detachably secured by screws or bolts 53 to upwardly projected longitudinally spaced portions of the block 31, so that the said elements 51 and 52 constitute the sides and top of the housing in which the dogs 49 and certain other parts, are mounted. For operating the dogs, I provide a three-armed lever 54, shown as pivoted by a stud 55 to an upright U-shaped plate 56. This plate 56 is rigidly secured to the depending flange of plate 51 and to the interior of the block 31, and its end flanges are spaced from the end lugs of said block, so as to afford guide channels for the dogs 49. At their upper ends, dogs 49 are provided with laterally projecting lips that rest on the ends of the upper arm of the lever 54. The depending arm of said lever 54 works through a clearance slot in the top of the valve 34, and projects into an elongated slot 33$^a$ of the piston rod 33.

It is highly important to note that the controller valve 34 in its underside, is provided with two longitudinally spaced ports 34$^a$. It will also be noted that cylinders 30, near their inner extremities, have ports 30$^a$ that open to the atmosphere, and that the outer ends of said cylinders are closed by heads 30$^b$.

As best shown in Fig. 9, the coupling tube 20 is provided with upwardly projecting rest lugs 57 that are bifurcated to embrace the tubes 39, and to which are secured U-shaped springs 58 that detachably grip said tubes 39 so that the pulsator proper will normally be held coupled to the tube 20, but may be readily detached, simply by pulling the block 31 off from the sleeve 44, and, of course, also drawing the tubes 39 from between the prongs of the springs 58. This facilitates the cleaning operation.

Returning now to the important feature of the present invention, and directing attention particularly to Figs. 4 to 7, inclusive, it will be noted that the air tube 45 is connected to the central chamber 59 of a block or bracket 60 that is secured to the tube 20 and rises therefrom. This block 60, at its upper end, has a threaded boss on which the lower end of the equalizing chamber 46 is detachably but rigidly secured with an air tight joint by threaded engagement. Secured to and rising axially from the blocks 60 and forming an upward extension of the central cavity 59 is a nozzle tube 61 that has an outstanding annular flange 62 that extends to the surrounding walls of the lower portion of the equalizing chamber 46 and is provided with one or more vertical air passages 63. Mounted to slide on the tube 61 between the blocks 60 and flange 62 is an annular valve 64 that is normally held by gravity in a lowered position so as to leave ports or passages 63 open. The block 60, eccentric to its central chamber 59 is provided with one or more small air ducts 65 that lead to the interior of the tube 20.

Operation.

The operation of the apparatus is substantially as follows:—Constant partial vacuum will be maintained in the milk pail, and as stated, this of course, will produce a partial vacuum or suction in the coupling tube 20, branch milk tubes 23, and in the inner chambers of the teat cups. In the position of the controller valve 34, shown in Fig. 4, left hand port 34ᵃ connects central port 37 to left hand port 38, thus connecting the two left hand teat cups and the outer end of left hand cylinder 30 to tube 20, so that at this time, air will be drawn from the said outer chambers of the two left hand teat cups into the said tube 20, and from thence through the common milk tube 12 into the milk pail; and at the same time, right hand port 34ᵃ connects right hand port 38 to the atmosphere through the inner end of right hand cylinder and right hand port 30ᵃ. This opening of right hand port 38 allows air to rush into right hand tube 39 and from thence through the right hand air tubes 43 into the outer annular chambers 27 of the right hand teat cups, thereby contracting the tubes of the said two teat cups, and producing a squeezing action that closely approximates that produced in the hand milking action.

In the position of the parts just described and shown in Fig. 4, the left hand lock dog 49 has just been lifted out of the left hand notch 47, so that right hand spring 36, which is then compressed, will immediately throw the said valve 34 toward the left to a position in which right hand dog 49 will engage right hand notch 47, and then temporarily lock said valve 34 in a position in which the relation of parts just described, will be reversed, that is, to a position in which right hand port 34ᵃ will connect intermediate port 37 to right hand port 38, and left hand port 34ᵃ will connect left hand port 38 to the atmosphere through left hand atmospheric port 30ᵃ. In this last noted position of the said valve 34, the annular air chambers of the two right hand teat cups will then be connected to tube 20 through chamber 46 and thus subjected to partial vacuum, which will be effective on the flexible inner casing 26, and at the same time, outer end of the left hand cylinder 30 and the annular chambers of the two left hand teat cups will be connected to the atmosphere. In the above description, it is assumed that the left hand air tube 39 is connected to two teat cups located on one side, and that the right hand air tube 39 is connected to two teat cups located on the other side, but of course, the said teat cups may be cross connected if desired.

When the outer end of left hand cylinder 30 is open to the atmosphere and the outer end of the right hand cylinder 30 is subjected to partial vacuum as just described, the pistons will be simultaneously moved toward the right, but the controller valve 37 will be held stationary by the right hand dog 49, while the left hand spring 36 is being compressed, and until left hand extremity of piston rod slot 33ᵃ strikes the lower end of the depending arm of lever 54, and thereby causes the upper right hand arm of said lever to lift said right hand dog out of right hand notch 47, thereby again freeing the said controller valve 34, and permitting the same to be quickly moved toward the right by the action of the compressed left hand spring 36. As valve 34 reaches the limit of its movement toward the right, the cam surface 35 of said valve, acting on left hand dog 49, will lift the same and then allow the said left hand dog to engage left hand notch 47 and again temporarily lock the said valve against return movement.

At the time when the compressed spring 36 is released to move valve 34, as above described, air pressure will be effective on one or the other of the pistons to prevent a return movement of the piston, but as soon as the valve has been moved far enough to partly open the ports, as above described, the air pressure on the piston will be released and trouble might ensue were it not for the fact that the friction between the pistons and the cylinders exceeds the friction between the controller valve 34 and its seat, so that the said pistons still afford a base of re-action for the compressed spring insuring the completion of the movement of the valve to complete port opening position.

When the piston is moved, as above described, in either direction, the air in the end of the cylinder against which the piston is being moved will be drawn though the corresponding air tube 39, connected ports 38, 34ᵃ, 37, sleeve 44, air tube 45, and equalizing chamber 46 and certain other parts noted and presently more fully described, into the milk tube 20 where the air will be commingled with the milk and will be drawn with the milk through the common milk tube 12 into the pail. The air thus drawn also hastens the flow of the milk to the pail.

The important action of the so-called equalizing vacuum chamber 46 will now be further considered, and it should first be noted that the conducting capacity of the air duct or ducts 65, as well as of ports 63 in flange 62, are considerably less than the conducting capacity of the nozzle tubes 61 and other connections between the same and the tubes 39, so that when air is admitted to the equalizing chambers, as above described, the equalization of the vacuum in chamber 46 with that in milk tube 20 will be retarded, that is, will not take place quickly. Therefore, the air will flow uniformly, or nearly so, from the teat cups to the milk tube 30 and there will be no shocks such as would be produced by sudden intermittent flow of air into the milk tube. Moreover, the partial vacuum in the equalizing chamber 46 will be kept lower, or slightly less intense, and in this way, there is maintained in the outer chambers of the teat cups a little greater pressure than in the inner chambers. This is important, because it prevents the rubber tubes or elastic members 26 of the teat cups from expanding too much, or, in other words, from moving away from the teats to an extent that will entirely release them from the teats. Otherwise stated, while the desired pulsation is produced, the flexible walls of the teat cups even when expanded, will have sufficient gripping action on the teats to prevent accidental dropping of the cups from position.

Another important feature to be noted is that when the milking operation starts and the milk flow is comparatively slow or small, the air carrying volume of the milk line is then the greatest and the vacuum in the milk line is comparatively high, thus causing the vacuum motors and the pulsating mechanism to operate at relatively high speed, as desired at such time. When, however, the milk begins to flow more freely the air capacity of the milk tube is reduced, thereby decreasing the intensity of the vacuum in chamber 46 and causing the vacuum motor and the pulsator to move slower, thereby giving the desired longer periods of suction and longer periods of squeezing action on the teats. Toward the "finishing of the milking operation", when the milk flow is again decreased, the intensity of the vacuum in equalizing chamber 46 again becomes higher, thereby causing the vacuum motor and pulsator mechanism to speed up. The speed of the machine is therefore automatically and properly controlled by the milk flow, and this feature adds greatly to the efficiency and success of the machine.

As already indicated, the check valve 64 on the nozzle tube 61 within the equalizing chamber 46 is normally out of action. Hence under ordinary operation of the machine, when the vacuum in the milk line is higher than in the equalizing chamber 46, this valve remains idle, or at rest, but if during the operation a teat cup should be dropped off, or if, through any other cause, such as a leakage through one of the flexible tubes 26 of one of the teat cups, air should be admitted to the milk line so that the vacuum in the milk line would become lower or less intense than in the equalizing chamber 46, then said valve 64 will be automatically raised and caused to close the ports 63 in flange 62, thereby preventing milk from being drawn into the said equalizing chamber 46. The same movement of the valve 64 will take place when the teat cups are removed from the cow and the device is turned upside down, in which latter case, the valve will be thrown into action by gravity.

What I claim is:

1. In a milking apparatus, the combination with a milk receptacle and a main combined milk and air tube extended therefrom, of a pulsator mechanism, an equalizing vacuum chamber and a group of teat cups connected to the extended end of said main tube, said pulsator mechanism being operated by partial vacuum rendered effective thereon through said main tube and through said equalizing vacuum chamber, and operating to produce pressure pulsations in said teat cups.

2. In a milking apparatus, the combination with a milk receptacle and a main combined milk and air tube extended therefrom, of a pulsator mechanism, an equalizing vacuum chamber and a group of teat cups connected to the extended end of said main tube, said pulsator mechanism being operated by partial vacuum rendered effective thereon through said main tube and through said equalizing vacuum chamber, and operating to produce pressure pulsations in said teat cups, the flow of air from said pulsator mechanism to said equalizing chamber being freer than the flow of air from said equalizing chamber to said main tube.

3. In a milking apparatus, the combination with a milk receptacle and a main combined milk and air tube extending therefrom, of a pulsator mechanism, an equalizing vacuum chamber and a group of teat cups connected to the extended end of said main tube, said teat cups having elastic inner walls dividing the same into inner and outer chambers, the inner chambers of said teat cups being connected to said main tube and the outer chambers of said teat cups being connected to said pulsator mechanism, said pulsator mechanism being connected to said equalizing chamber and said equalizing chamber being connected to said main tube.

4. In a milking apparatus, the combination with a milk receptacle and a main combined milk and air tube extending therefrom, of a pulsator mechanism, an equalizing vacuum chamber and a group of teat cups connected to the extended end of said main tube, said teat cups having elastic inner walls dividing the same into inner and outer chambers, the inner chambers of said teat cups being connected to said main tube and the outer chambers of said teat cups being connected to said pulsator mechanism, said pulsator mechanism being connected to said equalizing chamber and said equalizing chamber being connected to said main tube, said pulsator comprising a vacuum motor and valve mechanism and which valve mechanism intermittently connects the outer chambers of said teat cups to the atmosphere and the said equalizing chamber.

5. In a milking apparatus, the combination with a milk receptacle and a main combined milk and air tube extending therefrom, of a pulsator mechanism, an equalizing vacuum chamber and a group of teat cups connected to the extended end of said main tube, said teat cups having elastic inner walls dividing the same into inner and outer chambers, the inner chambers of said teat cups being connected to said main tube and the outer chambers of said teat cups being connected to said pulsator mechanism, said pulsator mechanism being connected to said equalizing chamber and said equalizing chamber being connected to said main tube, said pulsator comprising a vacuum motor and valve mechanism, and which valve mechanism intermittently connects the outer chambers of said teat cups to the atmosphere and the said equalizing chamber, the flow of air from said teat cups to said equalizing chamber being freer than the flow of air from said equalizing chamber to said main tube.

6. In a milking apparatus, the combination with a milk receptacle and a main combined air and milk tube extended therefrom, pulsator mechanism, an equalizing vacuum chamber and a group of teat cups connected to the extended end of said main tube, said teat cups having elastic inner walls dividing the same into inner and outer chambers, the inner chambers of said teat cups being connected to said main tube, said pulsator comprising a valve mechanism and a reciprocating vacuum motor, which motor operates said valve mechanism, conduits connecting said vacuum motor and the outer chambers of said teat cups to said equalizing vacuum chamber and arranged to be alternately opened and closed by said valve mechanism, and an air delivery conduit connecting said equalizing chamber to said main tube.

7. In a milking apparatus, the combination with a milk receptacle and a main combined air and milk tube extended therefrom, pulsator mechanism, an equalizing vacuum chamber and a group of teat cups connected to the extended end of said main tube, said teat cups having elastic inner walls dividing the same into inner and outer chambers, the inner chambers of said teat cups being connected to said main tube, said pulsator comprising a valve mechanism and a reciprocating vacuum motor, which motor operates said valve mechanism, conduits connecting said vacuum motor and the outer chambers of said teat cups to said equalizing vacuum chamber and arranged to be alternately opened and closed by said valve mechanism, and an air delivery conduit connecting said equalizing chamber to said main tube, the said valve mechanism being further arranged to connect the outer chambers of certain of the teat cups to the atmosphere, while the outer chambers of other teat cups are connected to said vacuum chamber, and to alternate the said actions as between the said teat cups.

8. In a milking apparatus, the combination with a milk receptacle and a main combined air and milk tube extended therefrom, pulsator mechanism, an equalizing vacuum chamber and a group of teat cups connected to the extended end of said main tube, said teat cups having elastic inner walls dividing the same into inner and outer chambers, the inner chambers of said teat cups being connected to said main tube, said pulsator comprising a valve mechanism and a reciprocating vacuum motor, which motor operates said valve mechanism, conduits connecting said vacuum motor and the outer chambers of said teat cups to said equalizing vacuum chamber and arranged to be alternately opened and closed by said valve mechanism, and an air delivery conduit connecting said equalizing chamber to said main tube, the said valve mechanism being further arranged to connect the outer chambers of certain of the teat cups to the atmosphere, while the outer chambers of other teat cups are connected to said vacuum chamber, and to alternate the said actions as between the said teat cups, the flow of air from said vacuum motor and teat cups to said equalizing chamber being freer than the flow of air from said equalizing chamber to said main tube.

9. In a milking apparatus, the combination with a milk receptacle and a tube extended therefrom, of a pulsator mechanism, an equalizing vacuum chamber and a group of teat cups connected to said tube, said pulsator mechanism being operated by partial vacuum rendered effective through said equalizing chamber and operative to produce pressure pulsations in said teat cups.

10. In a milking apparatus, the combination with a milk receptacle and a milk line tube extended therefrom, of a group of double chamber teat cups at the extended end of said milk line tube, a common pulsator mechanism for said group of teat cups, also located at the extended end of said milk line tube, said pulsator mechanism comprising a reciprocating vacuum motor and valve mechanism actuated thereby, the inner chambers of said teat cups being in constant connection with said milk line tube, and said valve mechanism operative to intermittently connect the outer chambers of the teat cups of said group to the atmosphere, and alternately therewith to intermittently connect said vacuum motor and the outer chambers of said group of teat cups to said milk line tube, and an equalizing vacuum chamber through which the latter noted connections are made.

11. In a milking apparatus, the combination with a receptacle in which partial vacuum is maintained, of a milk line tube extended therefrom and serving as a combined air and milk tube, a group of double chamber teat cups connected to the extended end of said milk line tube, a common pulsator mechanism for the said group of teat cups also connected to the extended end of said milk line tube, said pulsator mechanism being operated by partial vacuum rendered effective thereon through said milk line tube and operative to produce pressure pulsations in the outer chambers of said teat cups, and an equalizing device interposed between said pulsator mechanism and said main line tube and operating to prevent the pulsations produced in said teat cups from producing also pulsations in said milk line tube.

12. In a milking apparatus, the combination with a milk line tube in which partial vacuum is maintained, of a group of double chamber teat cups connected to the extended receiving end of said tube, means at the receiving end of said main tube for intermittently admitting air alternately into the outer chambers of the different teat cups of said group, and for intermittently, but in reverse order, connecting said outer teat cup chambers to said main line tube, and said latter connection to said milk tube, including an equalizing device for preventing pulsations produced in the teat cups from producing pulsations also in said milk line tube.

In testimony whereof I affix my signature.

LAURITS DINESEN.